US006707760B1

(12) United States Patent
Coon et al.

(10) Patent No.: US 6,707,760 B1
(45) Date of Patent: Mar. 16, 2004

(54) PROJECTILE SONAR (75) Inventors: Andrew C. Coon, Columbia, MD (US); Howard Allen Lazoff, Germantown, MD (US); Richard Phillip Taschler, Alexandria, VA (US)

(73) Assignee: BBNT Solutions LLC, Cambridge, MA (US)

( * ) Notice: Subject to any disclaimer, the term of this patent is extended or adjusted under 35 U.S.C. 154(b) by 0 days.

(21) Appl. No.: 10/302,211

(22) Filed: Nov. 22, 2002

(51) Int. Cl.[7] .............................................. F42B 12/56
(52) U.S. Cl. ....................................... 367/118; 367/145
(58) Field of Search ................................ 367/118, 145, 367/130, 3, 4, 5

(56) References Cited

U.S. PATENT DOCUMENTS

| 4,775,028 A |  | 10/1988 | de Heering | ................. | 181/124 |
| H1618 H | * | 12/1996 | Blume | ........................ | 367/129 |
| 6,430,108 B1 | * | 8/2002 | Pignol et al. | ............... | 367/145 |

FOREIGN PATENT DOCUMENTS

| GB |  | 2320556 | * | 6/1998 | ........... | F42B/12/56 |

OTHER PUBLICATIONS

Lazoff, Target Tracking Using Fuzzy Logic Association, 4 pages, Date unknown.*
L.E. Kinsler, A.R. Frey, A.B. Coppens and J.V. Sanders, Fundamentals of Acoustics (John Wiley & Sons, Inc., New York, 1982) $3^{rd}$ ed., Chap. 15.
H. Cox, "Fundamentals of Bistatic Active Sonar," BBN technical memorandum W1068, BBNT, Arlington, VA (1988).
Robert J. Urick, Principles of Underwater Sound, New York, NY, McGraw–Hill, Jan. 1, 1983, 423 pages.

* cited by examiner

*Primary Examiner*—Daniel T. Pihulic
(74) *Attorney, Agent, or Firm*—Leonard Charles Suchyta; James K. Weixel (57) ABSTRACT

Shells fired from the gun of a ship create an underwater explosion that is used to drive a sonar system. Sonobuoys [201] and/or a ship-towed array measure acoustic signals caused by the underwater explosion. A ship processing component [306] analyzes the signals and locates reflections of objects [102] in the signals. In addition to controlling the location at which to fire a shell, an adjustable fuze on the shell may be set to thereby control the depth at which the shell explodes. The low-frequency impulsive nature of the explosion makes it particularly suited for detecting objects in a littoral environment.

32 Claims, 5 Drawing Sheets

PROJECTILE SONAR

BACKGROUND OF THE INVENTION

A. Field of the Invention

The present invention relates generally to Anti-Submarine Warfare (ASW), and more particularly, to the detection of submarines using explosions to implement an active sonar system.

B. Description of Related Art

Submarines have been used as military weapons since the 18th century. Early submarines contained only crude weapons and had limited success.

Modern submarines, in contrast, have advanced significantly since the early days of the submarine. To combat modern enemy submarines, the military uses a number of ship and air based techniques to locate and destroy enemy submarines. Anti-submarine warfare (ASW) is a term used to generally describe techniques and devices employed for detecting and neutralizing submarines.

Detecting a submarine can be a difficult proposition: Multiple types of sensors may be used to detect enemy submarines. ASW sensors are divided into two basic types: acoustic and non-acoustic. Each sensor may have specific applications that counters different submarine operations. Many of these sensors complement and corroborate each other to enhance ASW effectiveness.

Non-acoustic sensors augment the detection capability provided by acoustic sensors. These sensors may use radar to detect exposed periscopes and hull surfaces, electro-magnetic systems to intercept the radar emissions from submarines, infra-red receivers to detect the heat signatures of surfaced submarines, or Magnetic Anomaly Detectors (MAD) to sense small changes in the Earth's magnetic field caused by the passage of a submarine.

Acoustic sensors, on the other hand, are based on the detection of sound waves traveling through the water. One type of acoustic sensor is a hydrophone used for detecting water-borne acoustic signals. Hydrophones may be employed in two general types of ASW systems, namely passive systems or active systems. In a passive ASW system, listening devices such as hydrophones are used to detect sound waves radiating from a submarine. Examples of sounds detected using passive listening techniques are machinery noise, propeller noise, torpedo launching transients, etc. In active ASW systems, a noise is generated and transmitted through the water such that it hits a submarine and is reflected back to a listening device such as a hydrophone. In active detection systems, short high intensity sound pulses are often used to detect submarines in an analogous way that radar signals are used in air to detect objects.

One conventional active acoustic sensing system involves dropping an explosive, typically from a helicopter, into the water. The explosion in the water generates a broadband impulsive event. Sensors, such as hydrophones implemented in a number of sonobuoys distributed around the area of the explosion, record the acoustic signals. Information from the sonobuoys can then be analyzed to locate objects, such as submarines, that are present in the water.

"Seeding" the water with explosives dropped from helicopters or planes can be an effective way to locate enemy submarines. However, the helicopter's load-limits constrain the number of explosives it can deploy per flight. Further, bad weather or operational dangers (such as enemy fire) can further degrade the usefulness of this approach to locating enemy submarines.

Accordingly, it would be desirable to more effectively implement an active sonar system that uses explosives to seed the water without requiring an aircraft.

SUMMARY OF THE INVENTION

Systems and methods consistent with the principles of this invention implement a projectile sonar system in which a shell launched via the gun of a ship is used to create an impulsive acoustic signal. The shells may also be used as standard munitions.

One aspect of the invention is directed to a method of detecting an object in a body of water. The method includes firing an explosive shell from a gun on a ship at a target location in the body of water, measuring acoustic signals caused by an explosion of the shell in the water, and identifying objects in the water based on the measured acoustic signals.

A second aspect of the invention is directed to a system that includes logic configured to receive acoustic signals from a sensor. The system additionally includes a feature extractor and a classifier. The feature extractor locates features in the acoustic signals and the classifier classifies the located features as an object. The system further includes a gun control component coupled to an output of the classifier and configured to set a location and depth for firing a shell from a gun of a ship, the shell being used to generate additional acoustic signals for processing by the feature extractor.

Another aspect of the invention is a system that includes a number of elements. In particular, the system includes sonobuoys positioned in a body of water, each of the sonobuoys include a sensor that senses acoustic signals in the body of water and a transmitter that transmits the sensed acoustic signals. The system further includes at least one gun configured to fire shells into the body of water and a first processing component. The first processing component is located on a ship and receives the acoustic signals from the sonobuoys and determines locations of objects in the body of water based on the acoustic signals.

Yet another aspect of the invention is directed to a method. The method includes receiving acoustic signals that correspond to an underwater explosion caused by detonation of a shell fired from a gun of a ship. The method further includes analyzing the acoustic signals to determine locations of underwater objects.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents of the claim features.

As described below, a sonar system uses projectiles launched from the gun of a ship, such as from a standard 5" gun. The projectiles explode after impact with a body of water to create a broadband impulsive sonar source. Sensors positioned in a vicinity of the explosion measure the resultant acoustic signal. Signal processing circuitry analyzes the information received at the sensors to determine the location of objects, such as enemy submarines, in the vicinity of the explosion. The low-frequency broadband nature of the acoustic signal generated by the underwater explosion is particularly effective in locating objects in a littoral, or coastal, environment.

As used herein, the term "body of water" refers broadly to any collection of water such as a section of open ocean, a lateral of a coastal shelf area, an inlet, bay, or a river. Further, submarine refers to any submerged object, such as traditional submarines, undersea mines, remotely piloted vehicles, sunken ships, or underwater mountains.

Figure 1A:
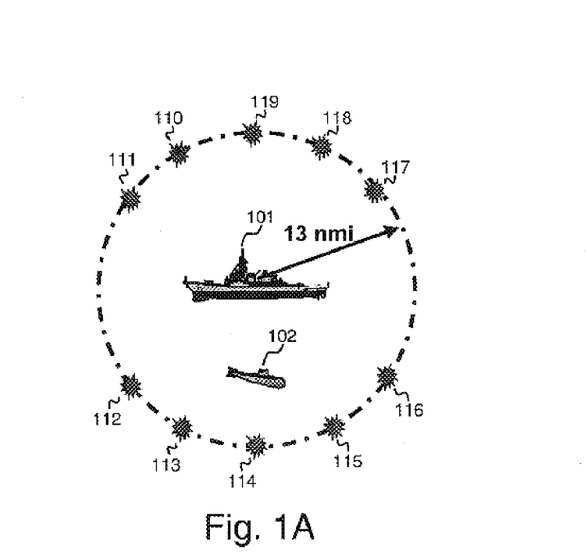
FIG. 1A is a diagram conceptually illustrating the firing of projectiles consistent with an a of the present invention.
Figure 1B:
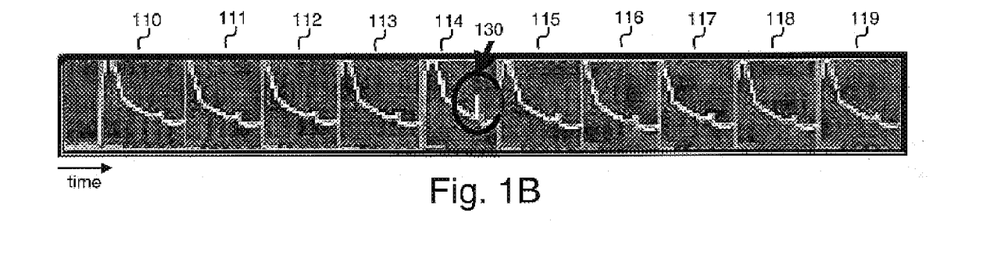
FIG. 1B is a series of graphs depicting acoustic signals generated by the projectiles shown in FIG. 1A.

FIG. 1A is a diagram conceptually illustrating the firing of projectiles consistent with an aspect of the present invention. As shown, a ship 101 fires one or more explosive projectiles into an area that the ship 101 would like to scan for a possible enemy submarine 102. In the example shown, ten shells are sequentially fired at various coordinates around the ship at a range of approximately 13 nautical miles (nmi). Each explosion 110–119 creates an impulsive acoustic signal that can be measured by sensors. FIG. 1B is a series of graphs depicting the corresponding acoustic signals generated by explosions 110–119. The graph of explosion 114 includes an echo 130, which may indicate that a portion of the acoustic signal bounced off an object.

Figure 2:
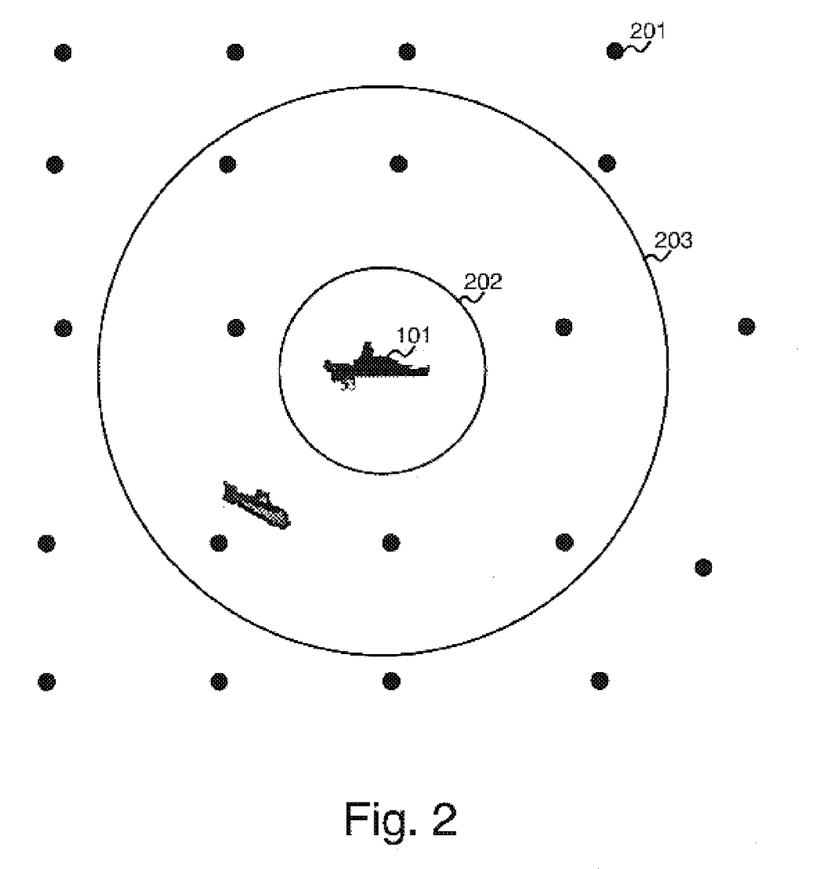
FIG. 2 is a diagram illustrating sensors arranged in a manner consistent with the invention.

The acoustic response of the explosions, such as explosions 110–119, are measured by sensors. FIG. 2 is a diagram illustrating sensors arranged in a manner consistent with the invention. In FIG. 2, a plurality of sensors 201 are arranged in the water surrounding ship 101. Circle 202 represents the shell firing range of ship 101 (e.g., 13 nmi). Circle 203 represents the useable detection range for the acoustic signals generated by the explosions at the firing range of ship 101 (i.e., on circle 202). In one implementation, the shells fired by ship 101 contain 8.9 lbs of high explosive. The maximum detection range of these shells, as represented by circle 203, may by between 25–45 nmi.

Sensors 201 may each be sonobuoys that were previously placed in the water by a ship or aircraft. Alternatively, or in conjunction with sonobuoys, ship 101 may tow an array of sensors (not shown). Ships other than ship 101, which are in the area, may also tow sensor arrays that may measure the acoustic signal caused by the explosions. In general, additional sensors lead to an increased possibility of obtaining a favorable target aspect, which should lead to a faster rate of detection.

Sonobuoys are well known in the art and generally include a buoy with an attached hydrophone. The hydrophone measures the underwater acoustic signals. The sonobuoys may additionally include a battery, a global positioning system (GPS) receiver, and a radio or satellite link through which the sonobuoy may transmit its measured signal data and its position. In one implementation, each of sonobuoys 201 may transmit their measured data to a central processing unit located on one or more of ship 101, a shore station, or an aircraft.

Figure 3:
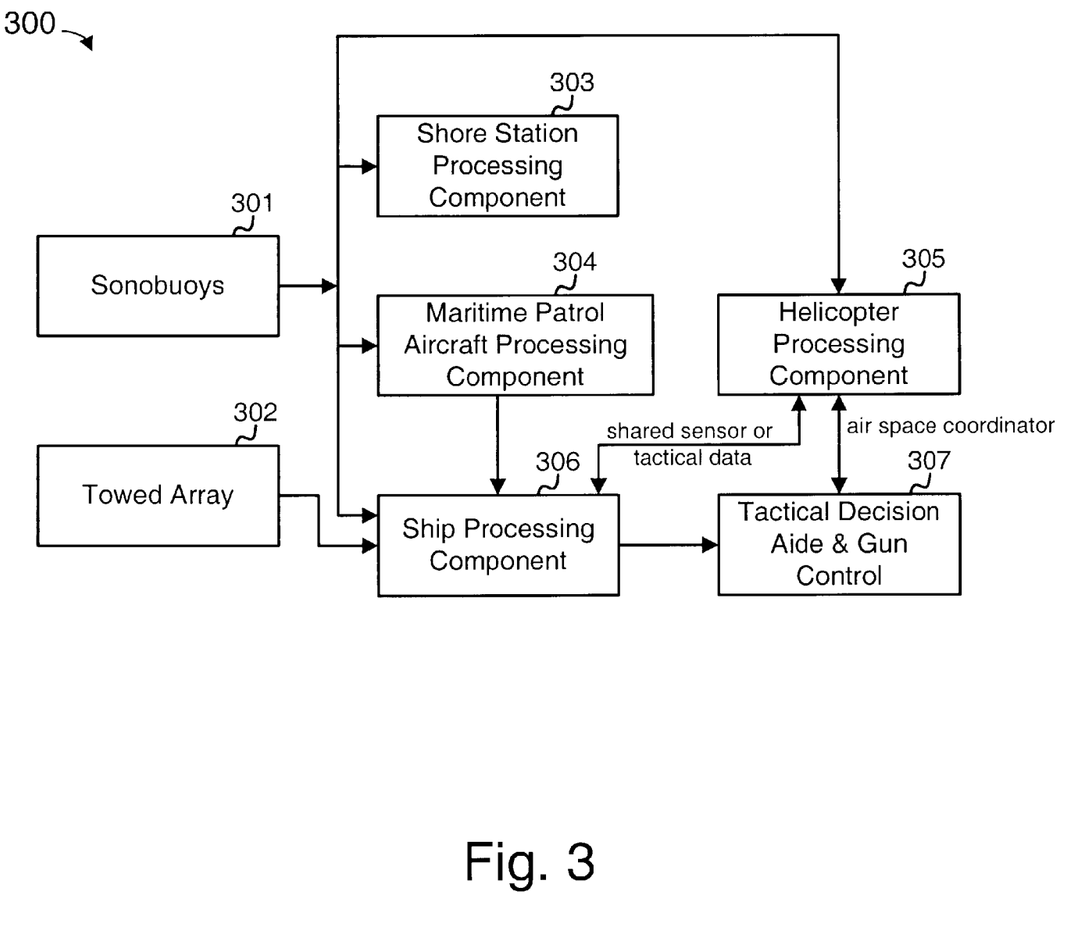
FIG. 3 is a block diagram conceptually illustrating components of a projectile sonar system consistent with the invention.

FIG. 3 is a block diagram conceptually illustrating components of a projectile sonar system 300 consistent with an aspect of the invention. System 300 includes sensors 301 and 302 for sensing acoustic signals in the water. More particularly, as previously mentioned, these sensors may include sonobuoys 301 and/or towed array(s) 302. Sonobuoys 301 may include air deployable active receiver (ADAR) sonobuoys that were dropped from an aircraft, such as a helicopter, and directional frequency and ranging (DIFAR) sonobuoys. Towed array 302 may include an SQR-19 tactical towed array or other array capable of facilitating long-range passive detection of enemy submarines. Towed array 302 may be towed far enough behind the ship so that it minimizes interference with noise radiating from the ship itself, such as propeller induced cavitation noise.

Sensors 301 may transmit their sensor acoustic data via, for example, a radio or satellite link, to a number of possible processing entities. As shown in FIG. 3, these entities may include a shore station processing component 303, a maritime patrol aircraft processing component 304, a helicopter processing component 305 (e.g., a Sikorsky MH60 helicopter), or a ship processing component 306. Processing components 303–306 may each include circuitry/software for analyzing the sensor acoustic data.

Processing components 303–306 may communicate with one another to share sensed data and/or higher level tactical information derived from the sensor acoustic data. More particularly, ship processing component 306 and helicopter processing component 305 may communicate with one another to share sensor acoustic data and/or tactical data derived from the sensor signal data. Maritime patrol aircraft processing component 304 may also transmit the sensor acoustic data and/or processed sensor acoustic data to ship processing component 306. In this manner, ship processing component 306 may act as a central analysis site that receives the acoustic signal data from all of the acoustic sensors 301 and 302. Ship 101 may then make tactical decisions based on this complete set of data.

After processing the sensor acoustic data at processing components 303–306, tactical decisions may be made based on the results. Tactical decision aide and gun control component 307 may include systems on ship 101 for displaying objects detected by processing components 303–306 and receiving operator commands based on the detected objects. Tactical decision component 307 may also communicate with the helicopter corresponding to processing component 305 and may, for example, instruct the helicopter to proceed to a certain location or to attack a confirmed target.

Tactical decision aide and gun control component 307 may additionally assist with the generation of an appropriate location to place the next shell. Shells fired by ship 101 may include fuzes that have delayed explosion settings. By adjusting the time from impact at which a shell explodes, tactical decision aide and gun control component 307 may adjust the depth of the explosion. A tactical shell such as the MK-160, when fired to a distance of 13 nmi, enters the water at a nearly vertical trajectory and with a speed of approximately 1200 feet/sec. Accordingly, adjusting the fuze delay has a straightforward effect on the depth of the explosion.

Figure 4:
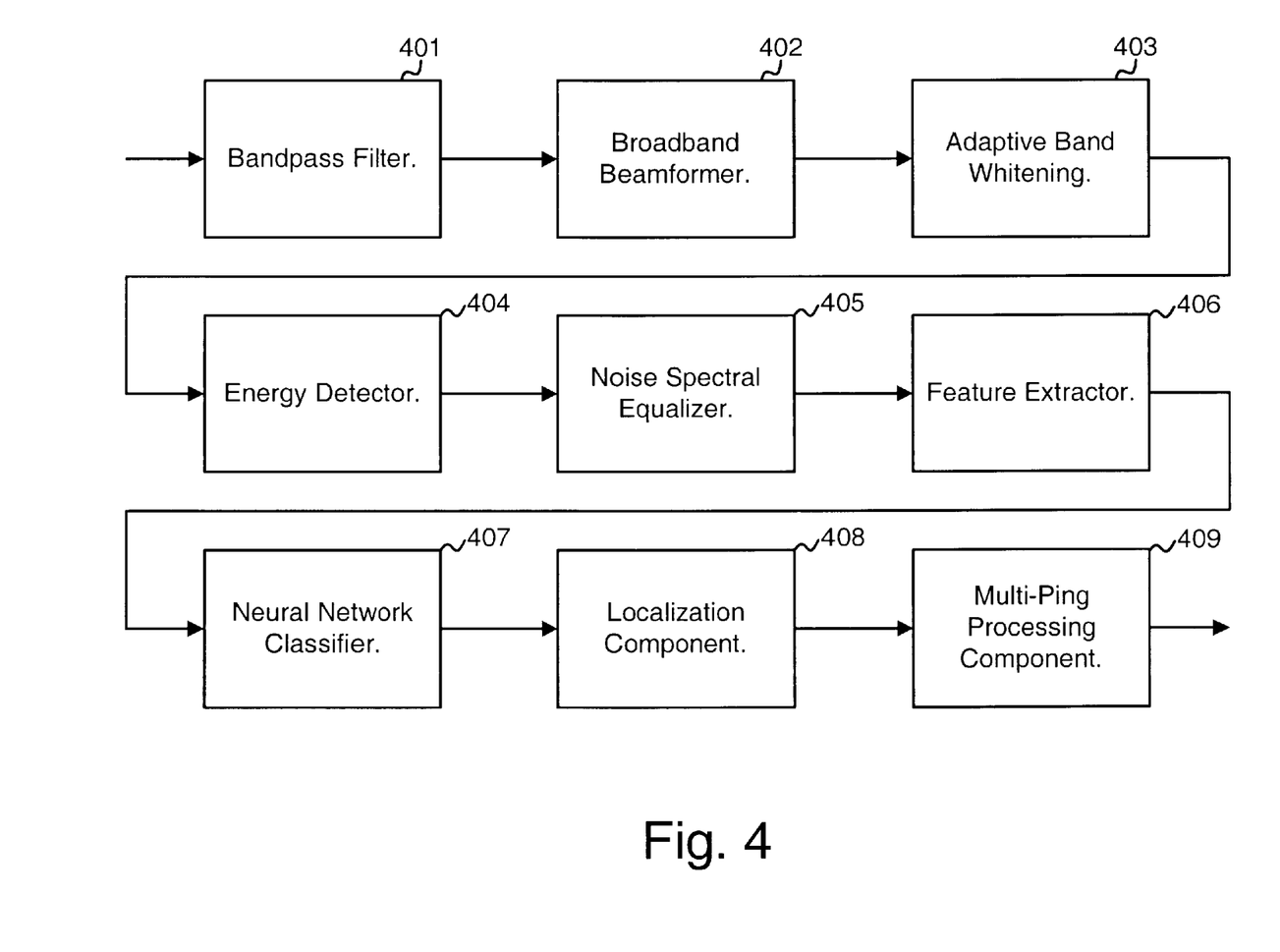
FIG. 4 is a diagram illustrating operation of the ship processing component shown in FIG. 3.

FIG. 4 is a diagram illustrating operation of ship processing component 306 in additional detail. Ship processing component 306 includes a number of components, connected in series, that process the signals from sensors 301 and 302 with the goal of extracting and locating objects, such as submarines, in the acoustic signal. As shown in FIG. 4, ship processing component 306 includes bandpass filter 401, broadband beamformer 402, adaptive band whitening component 403, energy detector 404, noise spectral equalizer 405, feature extractor 406, neural network classifier 407, localization component 408, and multi-ping processing component 409. Ship processing component 306 receives and operates on the acoustic signals. The processed or partially processed versions of the acoustic signal will be referred to herein as the acoustic signal or as a representation of the acoustic signal.

The acoustic data from sensors 301 and 302 may be initially passed through a bandpass filter 401 for filtering out undesired frequencies. Broadband beamformer 402 applies broadband beamforming techniques to the signal from bandpass filter 401. In general, beamforming is a signal processing technique that is used to identify the source (or sources) of signals. Beamformer 402 determines the directions from which the acoustic signals, sensed by multiple sensors, are received. Bandpass filters and beamformers are well known in the art.

Adaptive band whitening component 403 whitens the data spectrum using, for example, a split window normalizer applied in the frequency domain. The normalization factor is computed based on noise windows before and after the time of the window of interest at the same frequency.

Energy detector 404 examines energy levels in the signal. Signals corresponding to energy above a predetermined threshold level are captured. Noise spectral equalizer 405 equalizes the signal from energy detector 404. More particularly, noise spectral equalizer 405 adjusts for differences in the signal-to-noise ratio of the different frequency signals received from energy detector 404.

Feature extractor 406 and neural network classifier 407 examine the signals, after processing by components 401–405, to locate objects in the signals. Feature extractor 406 computes a feature vector from the raw data. The individual features from this data are calculated using signal, guard, and noise windows. Some examples of features that are calculated include shape statistics, time statistics, spectral statistics, and autoregressive coefficients. Neural network classifier 407 may then classify objects identified by feature extractor 406. Neural network classifier 407 may be trained, for example, to distinguish objects that correspond to submarines from other objects, such as naturally occurring objects.

Localization component 408 determines the three-dimensional position of objects identified by neural network classifier 407. In other words, when an object of interest is located by neural network classifier 407, localization component 408 determines the position of the object in the body of water. The position may be based on the bearing of the object and the measured time delay in the reflection of the acoustic signals from the object. Shells fired from conventional 5" ship guns may be accurate to within approximately 300 feet of the intended target. Accordingly, localization component 408 may locate objects with approximately 300 feet of potential error.

Multi-ping processing component 409 may examine objects detected in multiple explosions. Because multi-ping processing component 409 knows the time differences between the multiple explosions, multi-ping processing component 409 may determine the velocity of an object.

Processing components 303–305 may be implemented similarly to processing component 306, and may thus include elements similar to those shown in FIG. 4. The signal processing techniques used to implement each of elements 401–409 are generally well known in the art. Accordingly, more specific details relating to elements 401–409 will not be described further herein.

Figure 5:
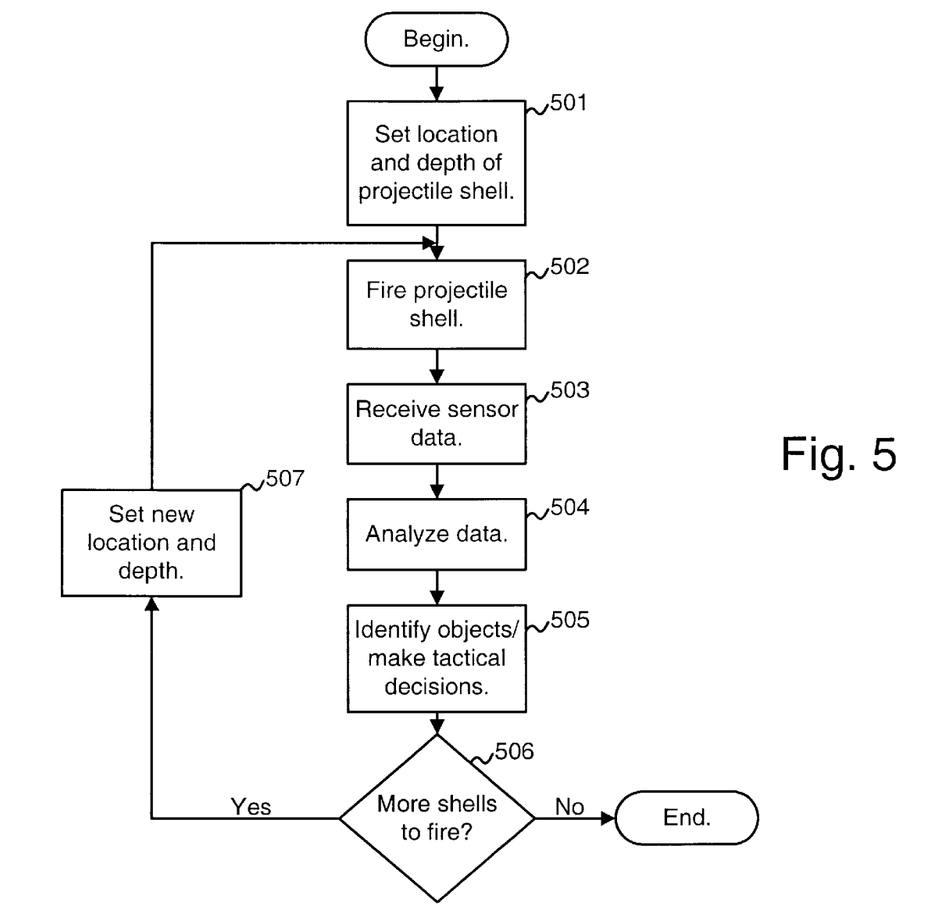
FIG. 5 is a flow chart illustrating operation of the projectile sonar system in a manner consistent with the present invention.

FIG. 5 is a flow chart illustrating operation of projectile sonar system 300 in a manner consistent with the present invention. Processing begins with system 300 determining the three-dimensional firing target (location and depth) for the projectile shell (Act 501). Thus, ship 101 may fire the shell at a specified location in the water, such as at a certain point on circle 202, and the shell may detonate at a specified depth in the water. The depth at which the shell detonates may be set via a delayed fuze having an adjustable delay amount. Alternatively, the fuze may be detonate based on a pressure sensor that detects the pressure of the water. The shell may then be fired from ship 101 (Act 502).

The explosion from the shell will generate an impulsive acoustic signal that may be measured by sensors 301 and 302 (Act 503). The received sensor data is analyzed by processing components 303–306 as discussed with reference to FIG. 4 (Act 504). Based on the analysis, objects may be located in the water and tactical decisions made (Act 505). For example, a tactical decision may be made to take evasive maneuvers away from an enemy submarine or to attack an enemy submarine. If more data is to be collected, additional shells may be fired (Act 506). In this situation, a new firing location and shell depth may be determined (Act 507). The new location and shell depth may be determined based on feedback from the firing of previous shells. If, for example, a potential object of interest was partially detected from the explosion from a previous shell, another shell may be fired in the same general area but at a different depth. Data from these two explosions may then be combined to generate a more complete picture of the object. Alternatively, the second shell may be fired into a different location that was not covered by the acoustic signals from the previous explosions.

CONCLUSION

As described herein, a projectile sonar system is implemented using acoustic energy generated by explosions from projectiles fired from a standard 5" gun. With the projectile sonar system, surface ships do not need to tie up their aircraft in performing ASW duties. This may potentially save maintenance time and fuel costs for the aircraft. Additionally, because the shells that are used as projectiles can be conventional shells, they are dual use shells, which do not take up any additional space on the ship and do not leave the ship's guns unprepared to defend itself. Further, the broadband nature of the impulsive acoustic signal generated by an explosion is particularly suitable for littoral environments.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, while the projectile shell discussed above was fired from a ship, in other implementations, the shell could be fired from guns positioned on land. Moreover, while a series of acts has been presented with respect to FIG. 5, the order of the acts may be different in other implementations consistent with the present invention.

Certain portions of the invention have been described as software that performs one or more functions. The software may more generally be implemented as any type of logic. This logic may include hardware, such as application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A method of detecting an object in a body of water, the method comprising:
    firing an explosive shell from a gun on a ship at a target location in the body of water;
    measuring acoustic signals caused by an explosion of the shell in the water; and
    identifying objects in the water based on the measured acoustic signals.

2. The method of claim 1, wherein measuring acoustic signals includes:
    sensing the acoustic signals using an array of sensors that are towed behind the ship.

3. The method of claim 1, wherein measuring acoustic signals includes:
    sensing the acoustic signals at a plurality of sonobuoys that are located in the body of water.

4. The method of claim 3, further comprising:
    transmitting representations of the acoustic signals sensed at the sonobuoys to a ship.

5. The method of claim 4, wherein the identifying objects further includes:
    analyzing the acoustic signals of multiple ones of the plurality of sonobuoys to obtain the velocity of the identified objects.

6. The method of claim 1, wherein the gun is a 5" gun and the explosive shell contains approximately 8.9 pounds of high explosive.

7. The method of claim 1, wherein the shell is set to detonate a selectable time period after initial impact with the water.

8. The method of claim 7, wherein the selectable time period is chosen based on a desired depth that the shell is set to penetrate the water before exploding.

9. The method of claim 1, wherein the shell is set to detonate at a preset pressure within the water.

10. A system comprising:
    logic configured to receive acoustic signals from at least one sensor;
    a feature extractor configured to locate features in the acoustic signals;
    a classifier configured to classify the located features as one of a plurality of objects; and
    a gun control component coupled to an output of the classifier and configured to set a location and depth for firing a shell from a gun of a ship, the shell being used to generate additional acoustic signals for processing by the feature extractor.

11. The system of claim 10, wherein the logic configured to receive the acoustic signals from the at least one sensor comprises:
    a bandpass filter configured to receive the acoustic signals; and
    a broadband beamformer coupled to an output of the bandpass filter.

12. The system of claim 11, wherein the logic configured to receive the acoustic signals from the at least one sensor further comprises:
    an adaptive band whitening component coupled to an output of the broadband beamformer;
    an energy detector coupled to an output of the adaptive band whitening component; and
    a noise spectral equalizer coupled to an output of the energy detector.

13. The system of claim 10, wherein the classifier includes neural networks trained on a set of objects that includes an object that corresponds to a submarine.

14. The system of claim 10, further comprising:
    a localization component configured to determine a three-dimensional position of objects classified by the classifier.

15. The system of claim 10, further comprising:
    a multi-ping processing component configured to determine a velocity for ones of the classified objects based on explosions caused by multiple shells.

16. The system of claim 10, wherein the gun control component is further configured to set the location and depth for firing the shell based on feedback from previously received acoustic signals.

17. A system comprising:
    a plurality of sonobuoys positioned in a body of water, each of the sonobuoys including:
        a sensor configured to sense acoustic signals in the body of water, and
        a transmitter configured to transmit representations of the sensed acoustic signals;
    at least one gun configured to fire shells into the body of water, the shells being configured to detonate in the body of water to produce the acoustic signals; and
    a first processing component, located on a ship, and configured to receive the representations of the acoustic signals from the sonobuoys and to determine locations of objects in the body of water based on the acoustic signals.

18. The system of claim 17, wherein the sonobuoys each additionally include:
    a global positioning system that generates location information for the sonobuoys, the location information being transmitted by the transmitter.

19. The system of claim 17, further comprising:
    a second processing component, located on a helicopter, and configured to receive the representations of the acoustic signals from the sonobuoys and to determine locations of objects in the body of water based on the acoustic signals.

20. The system of claim 17, wherein the gun is located on the ship.

21. The system of claim 20, wherein the gun is a 5" gun and the shells contain approximately 8.9 pounds of high explosive.

22. A method comprising:
    receiving acoustic signals generated by an underwater explosion caused by detonation of a shell fired from a gun of a ship; and analyzing the acoustic signals to determine locations of underwater objects.

23. The method of claim 22, further comprising:

measuring the acoustic signals by a plurality of sonobuoys.

24. The method of claim 22, wherein the gun is a 5" gun and the explosive shell contains approximately 8.9 pounds of high explosive.

25. The method of claim 22, wherein the shell is set to detonate a selectable time period after initial impact with the water.

26. The method of claim 25, wherein the selectable time period is chosen based on a desired depth that the shell is to penetrate the water before detonating.

27. The method of claim 2, wherein the shell includes a pressure sensor configured to detonate the shell at a predetermined depth.

28. A device comprising:

means for receiving acoustic signals that correspond to an underwater explosion caused by detonation of a shell fired from a gun of a ship; and means for analyzing the acoustic signals to determine locations of underwater objects.

29. The device of claim 28, further comprising:

means for measuring the acoustic signals.

30. The device of claim 29, wherein the gun is a 5" gun and the explosive shell contains approximately 8.9 pounds of high explosive.

31. The method of claim 1, further comprising:

modifying the target location in the body of water based on the objects identified in the water, and firing a second explosive shell from the gun of the ship based on the modified target location.

32. The device of claim 28, further comprising:

means for modifying a future target of a second shell based on the objects identified in the water.

* * * * *